US006399561B1

(12) United States Patent
Schneider et al.

(10) Patent No.: US 6,399,561 B1
(45) Date of Patent: Jun. 4, 2002

(54) METHODS AND COMPOSITIONS FOR BLEACHING A DYE IN SOLUTION

(75) Inventors: Palle Schneider, Ballerup; Heinz-Josef Deussen, Soborg, both of (DK)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 09/305,890

(22) Filed: May 5, 1999

Related U.S. Application Data

(63) Continuation of application No. PCT/DK99/00236, filed on Apr. 29, 1999.
(60) Provisional application No. 60/084,352, filed on May 5, 1998.

(30) Foreign Application Priority Data

May 1, 1998 (DK) ............................................ 0604/98

(51) Int. Cl.$^7$ ............................ C11D 3/00; C11D 7/42; C12S 9/00

(52) U.S. Cl. ...................... 510/392; 510/393; 510/226; 510/276; 510/312; 510/320; 510/374; 510/375; 510/321; 510/530; 8/101; 8/111; 8/401

(58) Field of Search ................................ 510/392, 393, 510/530, 226, 320, 321, 276, 312, 374, 375; 8/111, 401, 101

(56) References Cited

U.S. PATENT DOCUMENTS

| | | | | |
|---|---|---|---|---|
| 5,948,122 A | * | 9/1999 | Xu et al. | 8/401 |
| 5,958,083 A | * | 9/1999 | Onishi et al. | 8/102 |
| 6,048,367 A | * | 4/2000 | Damhus et al. | 8/111 |

FOREIGN PATENT DOCUMENTS

| | | | |
|---|---|---|---|
| DE | 44 45 088 | | 6/1996 |
| DE | 19632623 | * | 2/1998 |
| DE | 19843571 | * | 9/1998 |
| DE | 197 23912 | | 12/1998 |
| DE | 19842662 | * | 3/2000 |
| EP | 0 825 294 | | 2/1998 |
| EP | 0905306 | * | 3/1999 |
| WO | WO 91/05839 | | 5/1991 |
| WO | WO 94/12621 | | 6/1994 |
| WO | WO 94/29425 | | 12/1994 |
| WO | WO 95/01426 | | 1/1995 |
| WO | WO 96/10079 | | 4/1996 |
| WO | WO 97/48786 | | 12/1997 |
| WO | 00/27204 | * | 2/1998 |
| WO | 0825294 | * | 2/1998 |
| WO | 99/57360 | * | 11/1999 |

* cited by examiner

*Primary Examiner*—Yogendra N. Gupta
*Assistant Examiner*—Eisa Elhilo
(74) *Attorney, Agent, or Firm*—Elias Lambiris; Jason Garbell

(57) ABSTRACT

The present invention provides methods and compositions for bleaching a dye in solution comprising contacting, in an aqueous solution, the dye with a composition comprising a laccase and an enhancing agent of the formula:

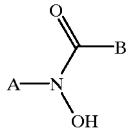

in which A is:

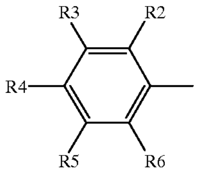

and B is H, or C1–C4 unbranched alkyl wherein said alkyl may contain ether groups, and one, two, three, four of R2, R3, R4, R5 and R6 are H, NH2, COOH, SO3H, CN, CH3, COCH3, NO2, OCH3, NR7R8, COOR9, or NOH—CO—R10, wherein R7, R8, R9 and R10 are C1–C2 unbranched alkyl, and one, two, three, four or five of R2, R3, R4, R5 and R6 is NH2, COOH, SO3H, CN, CH3, COCH3, NO2, OCH3, NR7R8, COOR9, or NOH—CO—R10, wherein R7, R8, R9 and R10 are C1–C2 unbranched alkyl.

11 Claims, No Drawings

METHODS AND COMPOSITIONS FOR BLEACHING A DYE IN SOLUTION

CROSS-REFERENCE TO RELATED APPLICATIONS

This application is a continuation application of PCT/DK99/00236 filed Apr. 29, 1999 and claims priority under 35 U.S.C. 119 of U.S. provisional application No. 60/084,352 filed May 5, 1998 and Danish application no. 0604/98 filed May 1, 1998, the contents of which are fully incorporated herein by reference.

FIELD OF INVENTION

The invention relates to a very effective method of bleaching a dye with a laccase enzyme and an enhancing agent. The invention also relates to a detergent composition.

BACKGROUND ART

It has earlier been found that colored substances leached from dyed fabrics could be bleached by means of a phenol oxidizing enzyme. The use of peroxidases or oxidases for inhibiting dye transfer in this way is described in WO 91/05839. It has also been shown that certain oxidizable substances, described as accelerators, enhancing agents or mediators, e.g., metal ions, phenolic compounds such as 7-hydroxycoumarin, vanillin, and p-hydroxybenzenesulfonate, are able to enhance the enzymatic bleaching reactions (see WO 91/05839).

Other types of enhancing agents have also been disclosed, e.g., phenothiazines, phenoxazines, methylsyringate and acetosyringone (see WO 94/12621, WO 95/01426 and WO 95/01426).

Yet other types of enhancing agents are the aliphatic, cycloaliphatic, heterocyclic and aromatic compounds containing NO, NOH or H—N(R)—OH disclosed in WO 94/29425 and WO 97/48786. In WO 94/29425 and WO 97/48786 benzotriazoles are preferred as enhancing agents for bleaching dyes.

It is the object of this invention to provide a selected group of —NOH compounds which, together with laccases, are very effective for bleaching dyes in solution.

SUMMARY OF THE INVENTION

It has now surprisingly been found that a selected group of —NOH compounds performs excellently as enhancing agents when used together with laccases for bleaching dyes in solution.

Accordingly, the invention provides a method for bleaching a dye in solution comprising contacting, in an aqueous solution, the dye with a laccase and an enhancing agent of the following formula:

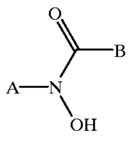

in which A is:

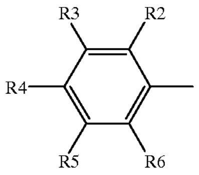

and B is H, or C1–C4 unbranched alkyl wherein said alkyl may contain ether groups, and R2, R3, R4, R5 and R6 are H, NH2, COOH, CN, SO3H, CH3, COCH3, NO2, OCH3, NR7R8, COOR9, or NOH—CO—R10, wherein R7, R8, R9 and R10 are C1–C2 unbranched alkyl.

DETAILED DESCRIPTION OF THE INVENTION

Enhancing Agents

The present invention relates to a method for bleaching a dye in solution comprising contacting, in an aqueous solution, the dye with a laccase and an enhancing agent of the following formula:

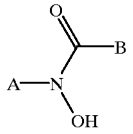

in which A is:

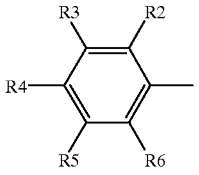

and B is H, or C1–C4 unbranched alkyl wherein said alkyl may contain ether groups, and R2, R3, R4, R5 and R6 are H, NH2, COOH, SO3H, CN, CH3, COCH3, NO2, OCH3, NR7R8, COOR9, or NOH—CO—R10, wherein R7, R8, R9, and R10 are C1–C2 unbranched alkyl; in particular R2, R3, R4, R5 and R6 are H, COOH, SO3H, CH3, COCH3, OCH3, NR7R8, or NOH—CO—R9, wherein R7, R8, and R9 are C1–C2 unbranched alkyl; especially at least three of R2, R3, R4, R5 and R6 should be H.

In a preferred embodiment B is H, or C1–C2 unbranched alkyl, and R2, R3, R4, R5 and R6 are H, NH2, COOH, SO3H, CN, CH3, COCH3, NO2, OCH3, NR7R8, COOR9, or NOH—CO—R10, wherein R7, R8, R9, and R10 are C1–C2 unbranched alkyl; in particular R2, R3, R4, R5 and R6 are H, COOH, SO3H, CH3, COCH3, OCH3, NR7R8, or NOH—CO—R9, wherein R7, R8, and R9 are C1–C2 unbranched alkyl; especially at least three of R2, R3, R4, R5 and R6 should be H.

In another preferred embodiment B is H, or CH3, and R2, R3, R4, R5 and R6 are H, NH2, COOH, SO3H, CN, CH3, COCH3, NO2, OCH3, NR7R8, COOR9, or NOH—CO—R10, wherein R7, R8, R9, and R10 are C1–C2 unbranched alkyl; in particular R2, R3, R4, R5 and R6 are H, COOH, SO3H, CH3, COCH3, OCH3, NR7R8, or NOH—CO—R9, wherein R7, R8, and R9 are C1–C2 unbranched alkyl; especially at least three of R2, R3, R4, R5 and R6 should be H.

In a particular preferred embodiment, the enhancing agent is N-hydroxyacetanilide.

The enhancing agent of the invention may be present in concentrations of from 1 to 1000 μM, preferably of from 5 to 500 μM, and more preferably of from 10 to 200 μM.

Preparation of Enhancing Agents

The enhancing agents described in the present application may be prepared using methods well known to those skilled in the art; a general procedure is outlined in Organic Syntheses 67, 1989, p. 187–192. Some of the enhancing agents are also commercially available.

N-hydroxyacetanilide was produced as described in Organic Syntheses 67, 1989, p. 187–192.

Enzyme

The laccase enzyme of the invention may typically be present in concentrations of from 1 to 10000 μg enzyme protein per liter aqueous solution, in particular of from 5 to 2000 μg enzyme protein per liter aqueous solution, especially of from 5 to 1000 μg enzyme protein per liter aqueous solution.

Required molecular oxygen will usually be present in sufficient quantity from the atmosphere. If more $O_2$ is needed, additional oxygen may be added.

Laccase and Laccase Related Enzymes

According to the present invention laccase or laccase related enzymes are the preferred enzymes used together with the selected group of —NOH compounds described above—when a dye in solution is to be bleached.

In the context of this invention, laccases and laccase related enzymes comprise any laccase enzyme comprised by the enzyme classification (EC 1.10.3.2), any catechol oxidase enzyme comprised by the enzyme classification (EC 1.10.3.1), any bilirubin oxidase enzyme comprised by the enzyme classification (EC 1.3.3.5) or any monophenol monooxygenase enzyme comprised by the enzyme classification (EC 1.14.18.1).

The above mentioned enzymes may be derived from plants, bacteria or fungi (including filamentous fungi and yeasts) and suitable examples include a laccase derivable from a strain of Aspergillus, Neurospora, e.g. *N. crassa,* Podospora, Botrytis, Collybia, Fomes, Lentinus, Pleurotus, Trametes, e.g. *T. villosa* and *T. versicolor,* Rhizoctonia, e.g. *R. solani,* Coprinus, e.g. *C. cinereus, C. comatus, C. friesii,* and *C. plicatilis,* Psathyrella, e.g. *P. condelleana,* Panaeolus,, e.g. *P. papilionaceus,* Myceliophthora, e.g. *M. thermophila,* Schytalidium, e.g. *S. thermophilum,* Polyporus, e.g. *P. pinsitus,* Pycnoporus, e.g. *P. cinnabarinus,* Phlebia, e.g. *P. radita* (WO 92/01046), or Coriolus, e.g. *C. hirsutus* (JP 2–238885).

A laccase derived from Coprinus, Myceliophthora, Polyporus, Pycnoporus, Scytalidium or Rhizoctonia is preferred; in particular a laccase derived from *Coprinus cinereus, Myceliophthora thermophila, Polyporus pinsitus, Pycnoporus cinnabarinus, Scytalidium thermophilum* or *Rhizoctonia solani.*

The laccase or the laccase related enzyme may furthermore be one which is producible by a method comprising cultivating a host cell transformed with a recombinant DNA vector which carries a DNA sequence encoding said laccase as well as DNA sequences encoding functions permitting the expression of the DNA sequence encoding the laccase, in a culture medium under conditions permitting the expression of the laccase enzyme, and recovering the laccase from the culture.

Determination of Laccase Activity (LACU)

Laccase activity is determined from the oxidation of syringaldazin under aerobic conditions. The violet color produced is photometered at 530 nm. The analytical conditions are 19 mM syringaldazin, 23 mM acetate buffer, pH 5.5, 30° C., 1 min. reaction time.

1 laccase unit (LACU) is the amount of enzyme that catalyses the conversion of 1.0 μmole syringaldazin per minute at these conditions.

Determination of Laccase Activity (LAMU)

Laccase activity is determined from the oxidation of syringaldazin under aerobic conditions. The violet color produced is photometered at 530 nm. The analytical conditions are 19 mM syringaldazin, 23 mM Tris/maleate buffer, pH 7.5, 30° C., 1 min. reaction time.

1 laccase unit (LAMU) is the amount of enzyme that catalyzes the conversion of 1.0 μmole syringaldazin per minute at these conditions.

Dyes or Colorants

In a preferred embodiment, the method of the invention finds application for bleaching of a textile dye or colorant or textile dyes or colorants in solution.

Colorants and dyes are broad classes of natural and synthetic compounds. The following description of dyes/colorants are not intended to be in any way limiting to the scope of the invention as claimed.

Synthetic textile dyes are typically azo compounds (with one or several azo, or diazenediyl, groups), as exemplified by Acid Red 151, Direct Blue 1, Direct Brown 44, and Orange II, or anthraquinone compounds such a5 Acid Blue 45.

Other structural motifs may occur together with these such as Reactive Blue 19.

Some dyes furthermore carry groups capable of coupling to fabric surfaces (reactive dyes), and some dyes are complexed to metal ions. These modifications will often not influence the applicability of the present invention.

A different structure is the indigo moiety, e.g., the soluble dye indigo carmine.

Other dyes and colorants may be of natural origin or may be synthesized as identical to or resembling natural structures. Examples of categories of colored substances extractable from vegetable sources are polyphenolic, anthocyanine and carotenoid compounds.

Industrial Applications

A specific embodiment of the present invention is provided by household and institutional laundering processes.

In such washing and rinsing processes, dyes and colorants present on fabrics may leach into the washing or rinsing liquor and discoloration of the laundry may result. Bleaching of the colored compounds in solution by the method of the invention may counteract this undesirable effect.

The present invention may also be used for bleaching stains present on fabric: these stains typically originate from red wine, fruit such as black currant, cherry, strawberry and tomato (in particular ketchup and spaghetti sauce), vegetables such as carrots and beetroot, tea, coffee, spices such as curry and paprika, grass, or ball pens/ink.

In another specific embodiment, dyes leached into process water during textile processing may be bleached by the method of the invention to prevent undesirable deposition.

In another specific embodiment, the method of the invention finds application in treatment of waste water, e.g., waste water from the chemical or pharmaceutical industry, from dye manufacturing, from dye-works, or from the textile industry, the method comprising treatment of the waste water with a laccase in the presence of an enhancing agent of the invention.

In the above mentioned processes and in other applications of the invention, the enhancing agent may be added at the beginning of the process or later, in one or several additions.

Detergent Compositions

The enhancing agent of the invention may be added to and thus become a component of a detergent composition.

The detergent composition of the invention may for example be formulated as a hand or machine laundry detergent composition including a laundry additive composition suitable for pretreatment of stained fabrics and a rinse added fabric softener composition, or be formulated as a detergent composition for use in general household hard surface cleaning operations, or be formulated for hand or machine dishwashing operations.

In a specific aspect, the invention provides a detergent additive comprising the enhancing agent of the invention and a laccase. The detergent additive as well as the detergent composition may comprise one or more other enzymes such as a protease, a lipase, a cutinase, an amylase, a carbohydrase, a cellulase, a pectinase, a mannanase, an arabinase, a galactanase, a xylanage, an oxidase, e.g., a laccase, and/or a peroxidase.

In general the properties of the chosen enzyme(s) should be compatible with the selected detergent, (i.e. pH-optimum, compatibility with other enzymatic and non-enzymatic ingredients, etc.), and the enzyme(s) should be present in effective amounts.

Proteases

Suitable proteases include those of animal, vegetable or microbial origin. Microbial origin is preferred. Chemically modified or protein engineered mutants are included. The protease may be a serine protease or a metallo protease, preferably an alkaline microbial protease or a trypsin-like protease. Examples of alkaline proteases are subtilisins, especially those derived from Bacillus, e.g., subtilisin Novo, subtilisin Carlsberg, subtilisin 309, subtilisin 147 and subtilisin 168 (described in WO 89/06279). Examples of trypsin-like proteases are trypsin (e.g. of porcine or bovine origin) and the Fusarium protease described in WO 89/06270 and WO 94/25583.

Examples of useful proteases are the variants described in WO 92/19729, WO 98/20115, WO 98/20116, and WO 98/34946, especially the variants with substitutions in one or more of the following positions: 27, 36, 57, 76, 87, 97, 101, 104, 120, 123, 67, 170, 194, 206, 218, 222, 224, 235 and 274.

Preferred commercially available protease enzymes include Alcalase™, Savinase™, Primase™, Duralase™, Esperase™, and Kannase™ (Novo Nordisk A/S), Maxatase™, Maxacal™, Maxapem™, Properase™, Purafect™, Purafect OXP™, FN2™, and FN3™ (Genencor International Inc.).

Lipases

Suitable lipases include those of bacterial or fungal origin. Chemically modified or protein engineered mutants are included. Examples of useful lipases include lipases from Humicola (synonym Thermomyces), e.g. from *H. lanuginosa* (*T. lanuginosus*) as described in EP 258 068 and EP 305 216 or from *H. insolens* as described in WO 96/13580, a Pseudomonas lipase, e.g. from *P. alcaligenes* or *P. pseudoalcaligenes* (EP 218 272), *P. cepacia* (EP 331 376), *P. stutzeri* (GB 1,372,034), *P. fluorescens,* Pseudomonas sp. strain SD 705 (WO 95/06720 and WO 96/27002), *P. wisconsinensis* (WO 96/12012), a Bacillus lipase, e.g. from *B. subtilis* (Dartois et al. (1993), Biochemica et Biophysica Acta, 1131, 253–360), *B. stearothenmophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, Wo 95/30744, WO 94/25578, WO 95/14783, WO 95/22615, WO 97/04079 and WO 97/07202.

Preferred commercially available lipase enzymes include Lipolase™, Lipolase Ultra™ and LipoPrime™ (Novo Nordisk A/S).

Amylases

Suitable amylases ($\alpha$ and/or $\beta$) include those of bacterial or fungal origin. Chemically modified or protein engineered mutants are included. Amylases include, for example, $\alpha$-amylases obtained from Bacillus, e.g. a special strain of *B. licheniformis,* described in more detail in GB 1,296,839.

Examples of useful amylases are the variants described in WO 94/02597, WO 94/18314, Wo 96/23873, and WO 97/43424, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

Commercially available amylases are Duramyl™, Termamyl™, Fungamyl™ and BAN™ (Novo Nordisk A/S), Rapidase™ and Purastar™ (from Genencor International Inc.).

Cellulases

Suitable cellulases include those of bacterial or fungal origin. Chemically modified or protein engineered mutants are included. Suitable cellulases include cellulases from the genera Bacillus, Pseudomonas, Humicola, Fusarium, Thielavia, Acremonium, e.g. the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having. color care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and PCT/DK98/00299.

Commercially available cellulases include Celluzyme™, and Carezyme™ (Novo Nordisk A/S), Clazinase™, and Puradax HA™ (Genencor International Inc.), and KAC-500 (B)™ (Kao Corporation).

Peroxidases/Oxidases

Suitable peroxidases/oxidases include those of plant, bacterial or fungal origin. Chemically modified or protein engineered mutants are included. Examples of useful peroxidases include peroxidases from Coprinus, e.g. from *C. cinereus,* and variants thereof as those described in WO 93/24618, WO 95/10602, and WO 98/15257.

Commercially available peroxidases include Guardzyme™ (Novo Nordisk A/S).

The detergent enzyme(s) may be included in a detergent composition by adding separate additives containing one or more enzymes, or by adding a combined additive comprising all of these enzymes. A detergent additive of the invention, i.e. a separate additive or a combined additive, can be formulated e.g. as a granulate, a liquid, a slurry, etc. Preferred detergent additive formulations are granulates, in particular non-dusting granulates, liquids, in particular stabilized liquids, or slurries.

Non-dusting granulates may be produced, e.g., as disclosed in U.S. Pat. Nos. 4,106,991 and 4,661,452 and may optionally be coated by methods known in the art. Examples of waxy coating materials are poly(ethylene oxide) products (polyethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols;

fatty acids; and mono- and di- and triglycerides of fatty acids. Examples of film-forming coating materials suitable for application by fluid bed techniques are given in GB 1483591. Liquid enzyme preparations may, for instance, be stabilized by adding a polyol such as propylene glycol, a sugar or sugar alcohol, lactic acid or boric acid according to established methods. Protected enzymes may be prepared according to the method disclosed in EP 238,216.

The detergent composition of the invention may be in any convenient form, e.g., a bar, a tablet, a powder, a granule, a paste or a liquid. A liquid detergent may be aqueous, typically containing up to 70% water and 0–30% organic solvent, or non-aqueous.

The detergent composition comprises one or more surfactants, which may be non-ionic including semi-polar and/or anionic and/or cationic and/or zwitterionic. The surfactants are typically present at a level of from 0.1% to 60% by weight.

When included therein the detergent will usually contain from about 1% to about 40% of an anionic surfactant such as linear alkylbenzenesulfonate, alpha-olefinsulfonate, alkyl sulfate (fatty alcohol sulfate), alcohol ethoxysulfate, secondary alkanesulfonate, alpha-sulfo fatty acid methyl ester, alkyl- or alkenylsuccinic acid or soap.

When included therein the detergent will usually contain from about 0.2% to about 40% of a non-ionic surfactant such as alcohol ethoxylate, nonylphenol ethoxylate, alkylpolyglycoside, alkyldimethylamineoxide, ethoxylated fatty acid monoethanolamide, fatty acid monoethanolamide, polyhydroxy alkyl fatty acid amide, or N-acyl N-alkyl derivatives of glucosamine ("glucamides").

The detergent may contain 0–65% of a detergent builder or complexing agent such as zeolite, diphosphate, triphosphate, phosphonate, carbonate, citrate, nitrilotriacetic acid, ethylenediaminetetraacetic acid, diethylenetriaminepentaacetic acid, alkyl- or alkenylsuccinic acid, soluble silicates or layered silicates (e.g. SKS-6 from Hoechst).

The detergent may comprise one or more polymers. Examples are carboxymethylcellulose, poly (vinylpyrrolidone), poly (ethylene glycol), poly(vinyl alcohol), poly(vinylpyridine-N-oxide), poly (vinylimidazole), polycarboxylates such as polyacrylates, maleic/acrylic acid copolymers and lauryl methacrylate/acrylic acid copolymers.

The detergent may contain a bleaching system which may comprise a $H_2O_2$ source such as perborate or percarbonate which may be combined with a peracid-forming bleach activator such as tetraacetylethylenediamine or nonanoyloxybenzenesulfonate. Alternatively, the bleaching system may comprise peroxyacids of e.g. the amide, imide, or sulfone type.

The enzyme(s) of the detergent composition of the invention may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

The detergent may also contain other conventional detergent ingredients such as e.g. fabric conditioners including clays, foam boosters, suds suppressors, anti-corrosion agents, soil-suspending agents, anti-soil redeposition agents, dyes, bactericides, optical brighteners, hydrotropes, tarnish inhibitors, or perfumes.

It is at present contemplated that in the detergent compositions any enzyme may be added in an amount corresponding to 0.01–100 mg of enzyme protein per liter of wash liqour, preferably 0.05–5 mg of enzyme protein per liter of wash liqour, in particular 0.1–1 mg of enzyme protein per liter of wash liqour.

The enhancing agent of the invention and a laccase may additionally be incorporated in the detergent formulations disclosed in WO 97/07202 which is hereby incorporated as reference.

The following examples further illustrate the present invention, and they are not intended to be in any way limiting to the scope of the invention as claimed.

EXAMPLE 1

Bleaching of Methyl Orange Using Various Laccases and Various NOH-type Enhancing Agents Materials and Methods Enzymes Recombinant *Coprinus cinereus* laccase (rCcL), produced as described in WO 97/08325, dialyzed against borate pH 9, 57.5 LAMU/ml.

Recombinant *Myceliophthora thermophila* laccase (rMtL), produced as described in WO 95/33836, 1419 LAMU/ml.

Recombinant *Polyporus pinsitus* laccase, produced as described in WO 96/00290, 1330 LACU/ml.

Buffer

Britton-Robinson buffer is composed of:

0.1 M phosphate 0.1 M borate 0.1 M acetate

Dye

Methyl orange (Merck, Germany)

Enhancing Agents

N-Hydroxyacetanilide

1-Hydroxybenzotriazole

2-Hydroxypyridine-N-oxide

N-Benzoyl-N-phenylhydroxylamine

Benzoic acid[6-(methylsulphonyl)indol-1-yl]ester (PFC-202)

Cyanuric acid

3-Hydroxy-1,2,3-benzotriazin-4(3H)-one

N-hydroxyphthalimide

2-Ethyl-5-phenylisoxazolium-4'-sulfonate, H2O p,p'-Azoxydiphenetole

Quinoline-N-oxide

Iso-quinoline-N-oxide di-2-pyridylketone oxime

| Bleaching assay | | Final conc. |
|---|---|---|
| 50 μl | Methyl orange, $AbsU_{464nm}$ ~7 | 1.4 AbsU |
| 125 μl | 0.1 M Britton-Robinson buffer | 50 mM |
| 25 μl | 2 mM mediator (or water) | 0.2 mM |
| 50 μl | laccase dilution | |

Reactions were started by addition of enzyme. Absorbance at 464 nm was followed for 3 minutes (readings every 5 seconds) on a Cobas Fara at 30° C. Initial bleaching rates were determined from the first linear part of the progress curves.

Results and Discussion

The N—OH compounds listed above were tested as laccase mediators in bleaching of methyl orange with three recombinant laccases (rPpL, rMtL and rCcL) at various pH values. All the kinetic data are summarized in Tables 1–3. Large negative numbers represent the best performance.

It can be seen from the Tables that bleaching with 0═C—N—OH types enhancing agents (see N-Hydroxyacetanilide) are surprisingly good compared with the other N—OH types enhancing agents.

TABLE 1

Initial changes per minute in A464 nm of methyl orange using rCcL (rCcL solution diluted 1:200).

| | PH 4 | pH 5 | pH 6 | pH 7 | pH 8 |
|---|---|---|---|---|---|
| none (reference) | −0.004 | −0.006 | −0.011 | −0.012 | −0.005 |
| N-hydroxyacetanilide | −0.521 | −0.719 | −0.674 | −0.498 | −0.136 |
| 1-hydroxybenzotriazole | −0.016 | −0.018 | −0.019 | −0.017 | −0.005 |
| 2-hydroxypyridine-N-oxide | −0.008 | −0.013 | −0.025 | −0.020 | −0.007 |
| N-benzoyl-N-phenylhydroxylamine | −0.163 | −0.247 | −0.529 | −0.592 | −0.124 |
| PFC-202 | −0.005 | −0.010 | −0.016 | 0.000 | 0.011 |
| Cyanuric acid | −0.005 | −0.008 | −0.012 | −0.012 | −0.005 |
| 3-hydroxy-1,2,3-benzotriazin-4(3H)-one | 0.004 | −0.004 | −0.011 | −0.008 | −0.002 |
| N-hydroxyphthalimide | −0.006 | −0.007 | −0.014 | −0.011 | −0.004 |
| 2-ethyl-5-phenylisoxazolium-4'-sulfonate, H2O | 0.005 | 0.000 | −0.006 | −0.004 | −0.001 |
| p,p'-azoxydiphenetole | 0.116 | 0.196 | 0.002 | 0.008 | 0.019 |
| Quinoline-N-oxide | −0.004 | −0.006 | −0.010 | −0.008 | −0.004 |
| Iso-quinoline-N-oxide | −0.002 | −0.005 | −0.008 | −0.010 | −0.004 |
| di-2-pyridylketone oxime | −0.004 | −0.006 | −0.008 | −0.006 | −0.001 |

TABLE 2

Initial changes per minute in A464 nm of methyl orange using rMtL (rMtL solution diluted 1:300).

| | pH 4 | pH 5 | pH 6 | pH 7 |
|---|---|---|---|---|
| none (reference) | −0.018 | −0.011 | −0.002 | −0.002 |
| N-hydroxyacetanilide | −1.306 | −1.847 | −0.630 | −0.101 |
| 1-hydroxybenzotriazole | −0.050 | −0.019 | −0.007 | −0.002 |
| 2-hydroxypyridine-N-oxide | −0.020 | −0.016 | −0.010 | −0.005 |
| N-benzoyl-N-phenylhydroxylamine | −0.269 | −0.296 | −0.082 | −0.012 |
| PFC-202 | −0.020 | −0.017 | 0.001 | 0.005 |
| Cyanuric acid | −0.013 | 0.010 | −0.002 | 0.000 |
| 3-hydroxy-1,2,3-benzotriazin-4(3H)-one | −0.016 | −0.011 | −0.001 | 0.002 |
| N-hydroxyphthalimide | −0.019 | −0.016 | −0.005 | 0.000 |
| 2-ethyl-5-phenylisoxazolium-4'-sulfonate, H2O | −0.012 | −0.004 | −0.002 | 0.000 |
| p,p'-azoxydiphenetole | 0.019 | 0.086 | 0.012 | 0.020 |
| Quinoline-N-oxide | −0.016 | −0.011 | −0.002 | 0.000 |
| Iso-quinoline-N-oxide | −0.017 | −0.010 | −0.004 | 0.000 |
| di-2-pyridylketone oxime | −0.026 | −0.010 | −0.001 | 0.001 |

TABLE 3

Initial changes per minute in A464 nm of methyl orange using rPpL (rPpL solution diluted 1:200).

| | PH 4 | pH 5 | pH 6 | pH 7 |
|---|---|---|---|---|
| none (reference) | −0.073 | −0.038 | −0.017 | −0.002 |
| N-hydroxyacetanilide | −4.743 | −6.528 | −1.837 | −0.055 |
| 1-hydroxybenzotriazole | −0.206 | −0.077 | −0.017 | −0.005 |
| 2-hydroxypyridine-N-oxide | −0.084 | −0.052 | −0.024 | −0.006 |
| N-benzoyl-N-phenylhydroxylamine | −0.732 | −1.402 | −0.420 | −0.012 |
| PFC-202 | −0.047 | −0.035 | −0.001 | 0.000 |
| Cyanuric acid | −0.037 | −0.022 | −0.011 | −0.002 |
| 3-hydroxy-1,2,3-benzotriazin-4(3H)-one | −0.020 | −0.020 | −0.008 | 0.000 |
| N-hydroxyphthalimide | −0.050 | −0.035 | −0.011 | −0.001 |
| 2-ethyl-5-phenylisoxazolium-4-sulfonate, H2O | −0.017 | −0.017 | −0.006 | 0.001 |
| p,p-azoxydiphenetole | 0.121 | 0.013 | 0.017 | 0.018 |
| Quinoline-N-oxide | −0.074 | −0.041 | −0.016 | −0.002 |
| iso-quinoline-N-oxide | −0.074 | −0.037 | −0.014 | −0.002 |
| di-2-pyridylketone oxime | −0.124 | −0.107 | −0.053 | −0.005 |

EXAMPLE 2

Bleaching of Methyl Orange with Laccase and New —NOH—CO— Type Mediators

Materials and Methods

Enzymes

*Polyporus pinsitus* laccase as described in Example 1.

Dye

Methyl orange (Merck, Germany)

Enhancing Agents

N-Hydroxyacetanilide

N-(4-cyanophenyl)-N-hydroxyacetamide (CAS 80584-65-2)

Bleaching assay

50 μl 0.1 mg/ml methyl orange

125 μl 0.1 M Britton-Robinson buffer (see example 1)

25 μl 2 mM mediator or water (as reference)

50 μl laccase dilution (1:400)

Methyl orange, buffer and mediator are mixed in a microtitre plate and the reaction is started by addition of laccase. Absorbance is measured at 450 nm after 15 min.

Results and Discussion

N-Hydroxyacetanilide and N-(4-cyanophenyl)-N-hydroxyacetamide were tested as mediators in bleaching of methyl orange with a laccase at pH 4–6. The kinetic data are summarized in Table 4. Low values represent the best performance.

The data show N-(4-cyanophenyl)-N-hydroxyacetamide to be as effective as N-Hydroxyacetanilide at bleaching a dye in solution.

TABLE 4

Absorbance measured at 450 nm after 15 minutes.

| | pH 4 | pH 5 | pH 6 |
|---|---|---|---|
| None (reference) | 0.920 | 1.104 | 1.183 |
| N-Hydroxyacetanilide | 0.077 | 0.068 | 0.087 |
| N-(4-cyanophenyl)-N-hydroxyacetamide | 0.065 | 0.055 | 0.083 |

EXAMPLE 3

Bleaching of Various Dyes with Laccase and N-Hydroxyacetanilide Materials and Methods Enzymes

*Polyporus pinsitus* laccase as described in Example 1, except that the concentration is 1726 LACU/ml.

Dyes

Acid blue 113 (Aldrich)

CSB (Aldrich)

Acid blue 45 (Aldrich)

Cibachron Marine (Ciba Specialty Chemicals)

Enhancing agent

N-Hydroxyacetanilide

Bleaching assay
50 μl dye solution
125 μl 0.1 M Britton-Robinson buffer, pH 5 (see example 1)
25 μl 2 mM mediator or water (as reference)
50 μl laccase dilution (1:400) or water (as reference)

Dye, buffer and mediator are mixed in a micro-titre plate and the reaction is started by addition of laccase. Absorbance is measured at 595 nm after 5 min.

Results and Discussion

N-Hydroxyacetanilide was used as mediator in bleaching of various dyes with a laccase. The kinetic data are summarized in Table 5. Low values represent the best performance.

The data shows that the mediator enhances bleaching of several different dyes.

TABLE 5

Absorbance measured at 595 nm after 5 minutes.

| Dye | − enzyme − mediator | + enzyme − mediator | + enzyme + mediator |
|---|---|---|---|
| Acid blue 113 | 0.474 | 0.265 | 0.062 |
| CSB | 0.948 | 0.459 | 0.207 |
| Acid blue 45 | 0.941 | 0.490 | 0.123 |
| Cibacron Marine | 0.981 | 0.438 | 0.235 |

What is claimed is:

1. A method for bleaching a dye in solution comprising contacting, in an aqueous solution, the dye with a laccase and an enhancing agent of the following formula:

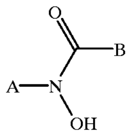

in which A is:

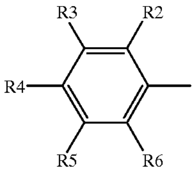

and B is H, or C1–C4 unbranched alkyl wherein said alkyl may contain ether groups, and one, two, three, or four of R2, R3, R4, R5 and R6 are H, NH2, COOH, SO3H, CN, CH3, COCH3, NO2, OCH3, NR7R8, COOR9, or NOH—CO—R10, and at least one of R2, R3, R4, R5 and R6 is NH2, COOH, SO3H, CN, COOCH3, NO2, OCH3, NR7R8, COOR9, or NOH—CO—R10, and wherein R7, R8, R9 and R10 are C1–C2 unbranched alkyl.

2. The method of claim 1, in which the laccase is a microbial laccase.

3. The method of claim 2, wherein the laccase is derived from Coprinus, Myceliophthora, Polyporus, Pycnoporus, Scytalidium or Rhizoctonia.

4. The method of claim 3, wherein the laccase is derived from *Coprinus cinereus, Myceliophthora thermophila, Polyporus pinsitus, Pycnoporus cinnabarinus, Scytalidium thermophilum* or *Rhizoctonia solani.*

5. The method of claim 1, which is a method for inhibiting the transfer of a textile dye from a dyed fabric to another fabric when said fabrics are washed together in a wash liquor.

6. The method of claim 5, in which the enhancing agent is added at the beginning of, or during the process.

7. The method of claim 1, in which the concentration of the enhancing agent is in the range of from 1 to 1000 μM.

8. A detergent composition comprising a laccase, a surfactant and an enhancing agent of the formula:

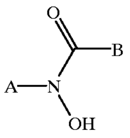

in which A is:

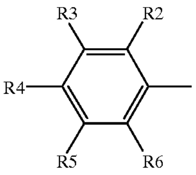

and B is H, or C1–C4 unbranched alkyl wherein said alkyl may contain ether groups, and one, two, three, or four; of R2, R3, R4, R5 and R6 are H, NH2, COOH, SO3H, CN, CH3, COCH3, NO2, OCH3, NR7R8, COOR9, or NOH—CO—R10, and at least one of R2, R3, R4, R5 and R6 is NH2, COOH, SO3H, CN, COCH3, NO2, OCH3, NR7R8, COOR9, or NOH—CO—R10, and wherein R7, R8, R9 and R10 are C1–C2 unbranched alkyl.

9. The detergent composition of claim 8, wherein the laccase is derived from Coprinus, Myceliophthora, Polyporus, Pycnoporus, Scytalidium or Rhizoctonia.

10. The detergent composition of claim 9, wherein the laccase is derived from *Coprinus cinereus, Myceliophthora thermophila, Polyporus pinsitus, Pycnoporus cinnabarinus, Scytalidium thermophilum* or *Rhizoctonia solani.*

11. The detergent composition of claim 8, which further comprises one or more other enzymes selected from the group consisting of a protease, a lipase, an amylase, a cellulase and a cutinase.

* * * * *